Oct. 29, 1968  B. W. O. DICKINSON III  3,407,650
ULTRASONIC APPARATUS FOR DETECTING FLAWS
Filed April 5, 1965
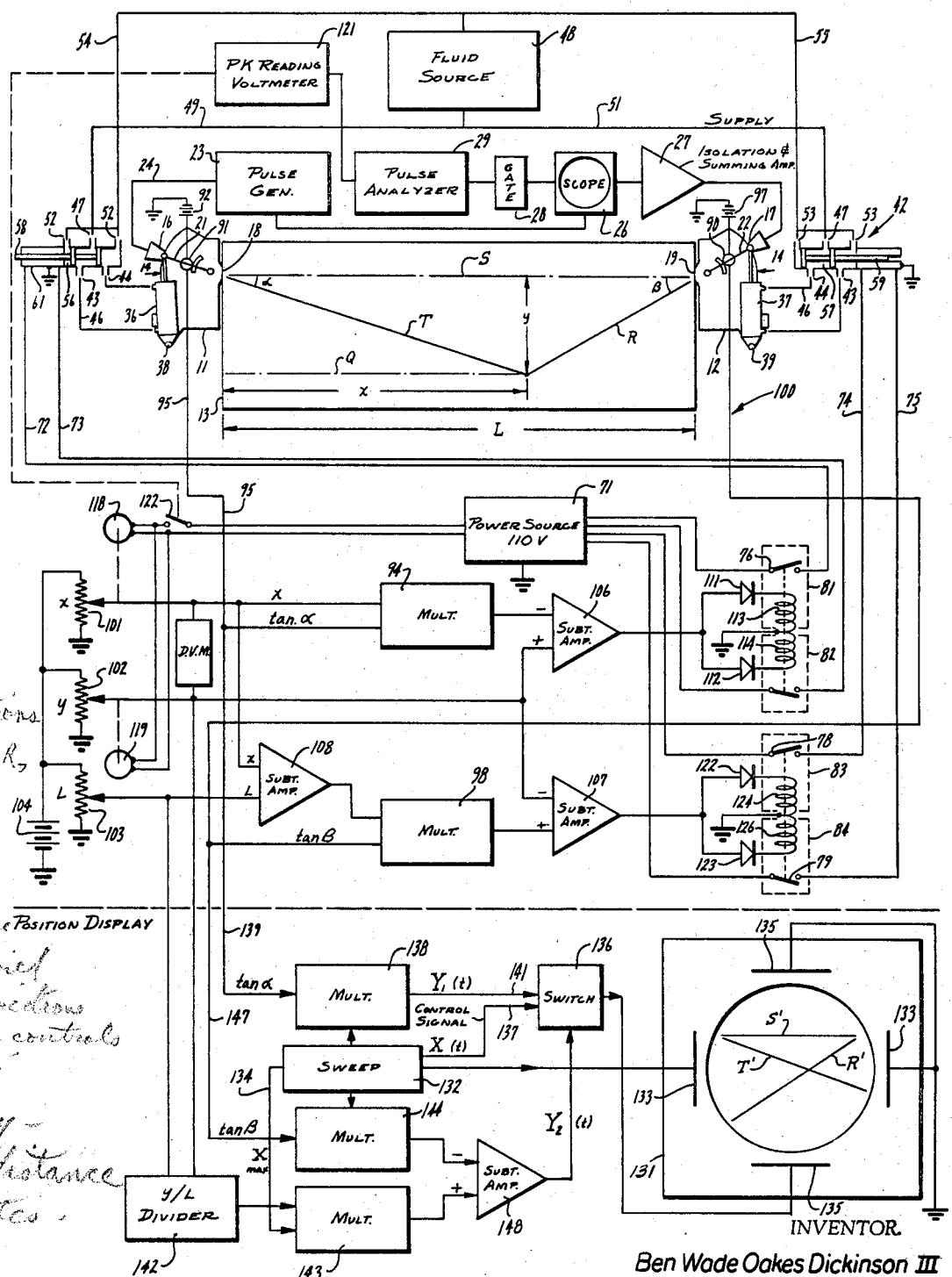
INVENTOR.
Ben Wade Oakes Dickinson III
BY 
Attorneys

United States Patent Office 3,407,650
Patented Oct. 29, 1968

3,407,650
ULTRASONIC APPARATUS FOR
DETECTING FLAWS
Ben Wade Oakes Dickinson III, 3290 Jackson St.,
San Francisco, Calif. 94118
Filed Apr. 5, 1965, Ser. No. 445,529
8 Claims. (Cl. 73—67.7)

ABSTRACT OF THE DISCLOSURE

Ultrasonic testing apparatus using spaced apart wave directors capable of controlled scanning of transmit and receive wave trains in variable directions about an object under test. Control circuits synchronize the scanning to a particular inspection region in the object using a servo-loop which operates independently of the information contained on the ultrasonic wave trains.

This invention relates to an ultrasonic apparatus for use in detecting flaws in objects and more particularly to such an apparatus for scanning the complete object or portions of the object to detect flaws.

In the past, apparatus has been provided utilizing ultrasonics for detecting flaws in objects.

In copending application Ser. No. 151,331, filed Nov. 9, 1961, now Patent No. 3,186,216 there is disclosed a method and apparatus for detecting flaws in which it is possible to locate the flaws. However, in such apparatus, no means is provided for progressively scanning portions of the object being inspected or the complete object in progressive increments. In addition, in such apparatus, no means is disclosed for correlating the position of the transmit and receive transducers with respect to each other to aid in the location of any flaws located in the object being inspected. There is therefore a need for a new and improved apparatus for ultrasonically inspecting objects.

In general, it is an object of the present invention to provide an ultrasonic apparatus for detecting flaws in objects in which the movement of the transmit and receive transducers is correlated.

Another object of the invention is to provide an apparatus of the above character in which it is possible to scan portions of the object or the complete object to locate flaws in the object.

Another object of the invention is to provide an apparatus of the above character in which the transmit and receive transducers are moved in synchronism without the utilization of information derived from ultrasonic wave trains reflected from a flaw.

Another object of the invention is to provide an apparatus of the above character in which the transmit and receive transducers are shifted in such a direction so that lines representing the direction of transmission of the ultrasonic wave trains and reception of the ultrasonic wave trains intersect in the particular portion of the object being inspected.

Another object of the inventiton is to provide an apparatus of the above character which is particularly useful for scanning longitudinal and girth welds in pipe.

Another object of the invention is to provide an apparatus of the above character in which a visual display in the nature of conformal map is given, representing the direction of introduction of the ultrasonic wave trains and the direction of reception of the ultrasonic wave trains and the point of intersection of the same in the object.

Another object of the invention is to provide apparatus of the above character in which the position of intersection of the lines representing the direction of introduction of the ultrasonic wave trains and the direction of reception of the ultrasonic wave trains is visually displayed.

Additionally objects and features of the invention will appear from the following description in which the preferred embodiment is set forth in detail in conjunction with the accompanying drawing which includes a circuit diagram partly in block form of apparatus for controlling the direction of transmission and reception of ultrasonic wave directors and incorporating the present invention.

In general, the present invention provides means for introducing and receiving ultrasonic wave trains into and from a test object and for varying the direction of introduction and reception. Means is provided for synchronizing the directions. Such means makes use of an analog computer to compare voltages representing the desired inspection coordinates within a test object with voltages representing measured directions of transmission and reception. The computer generates an output signal representing the difference found in the comparison. This signal is applied to means for controlling the direction of transmission or reception. A position display of the lines defined by the directions of transmission and reception is also provided.

As shown in the accompanying drawing, means is provided for introducing and receiving ultrasonic wave trains and consists of a transmit wave director 11 and a receive wave director 12 mounted on a test object 13 which may be of any configuration such as cylindrical or flat. The wave directors 11 and 12 are pressed into close fitting or intimate engagement with the test object 13 by suitable means (not shown) which apply forces in the direction indicated by the arrows 14.

The wave directors 11 and 12 are each provided with movable transducer holders 16 and 17 for adjusting the direction of transmission and reception of each of the wave directors. The movable transducer holders 16 and 17 are mounted for pivotal movement about the contact areas 18 and 19 between the wave directors and the test object by means of frames 21 and 22.

The transmit movable transducer holder 16 contains a suitable transducer (not shown) for generating ultrasonic wave trains or pulses from suitable electrical pulses. The transmit transducer is supplied electrical pulses from a pulse generator 23 through conductor 24. Such pulses are of about 1.5 kv. and 80 nano sec. rise time and have a duration of 1 to 100 micro sec. Any suitable pulsing equipment may be used to supply the pulses, such as a combination of Model 123 pulser manufactured by E-H Laboratories, Oakland, Calif., and a Model 350 pulse amplifier as made by the Velonix Division of Pulse Engineering Corporation of Santa Clara, Calif.

The receive movable transducer holder 17 contains a similar suitable transducer (not shown) for converting sensed ultrasonic wave trains into electrical signals. These signals are supplied to display oscillocope 26 through an isolation and summing amplifier 27 which has an approximate bandwidth of 1.6 to 3.5 megacycles. The sweep of the oscilloscope 26 is triggered by the pulse generated by the pulsing equipment 23 which is transmitted to the oscilloscope through conductor 31. A time variable gate 28 sends selected portions of the received ultrasonic wave train signal to a pulse analyzer 29 for spectrum analysis. Suitable standard electronic equipment is available to perform the above indicated operations and can consist of a Kane Engineering Laboratories Model 507 amplifier set to provide a gain of 80 db and a pass band of about 1.6 to 3.5 mc. The oscilloscope can be a Model 564 with 3A1 and 3B3 plug-in modules manufactured by Tektronix, Inc. and equipped with a suitable variable input gate. The spectrum analyzer can be a Model SPA–3a manufactured by Singer Metric.

The wave directors 11 and 12 are provided with means for moving the movable transducer holders 16 and 17 associated therewith and thus varying the direction (or orientation) of transmission and reception of ultrasonic wave trains. These means include fluid actuated two-way actuators 36 and 37 which are pivotally mounted at 38 and 39 by suitable means (not shown) and are attached to their respective movable transducer holder frames 21 and 22. The actuators shown are reversible piston actuators. The wave directors 11 and 12 and the associated mechanisms are described in detail in my copending application, Ser. No. 445,503, filed Apr. 5, 1965, now U.S. Patent No. 3,299,696, and for that reason will not be described in detail herein.

Means is provided to control the fluid supplied to the actuators and consists of solenoid control valves 41 and 42 which are provided with output ports 43 and 44. Each of the actuators is connected to the ports 43 and 44 by suitable fluid conducting tubing 46. Each of the solenoid valves 41 and 42 is a three-position, four-way valve and is provided with supply ports 47 which are connected to a source 48 of fluid under pressure by fluid conducting supply tubing 49 and 51. The valves 41 and 42 are also provided with return ports 52 and 53 connected to the source 48 by fluid conducting return tubing 54 and 55. In one application wherein a hydraulic system was used, the source was constructed to supply hydraulic fluid under 1000 p.s.i. pressure.

Each of the valves 41 and 42 includes spools 56 and 57 connected to armatures 58 and 59 respectively which lie in the magnetic fields produced in the solenoids 61 and 62, respectively. When the solenoids are not energized, the spools 56 and 57 are maintained in a centered position by suitable springs (not shown) and thus close both the output ports 43 and 44, isolating the actuators from the fluid source 48.

As shown in the drawing, control valve 41 has its solenoid 61 energized so as to move the armature 58 to the left, thus opening the port 43 for communication with supply port 47. Also, the port 44 is opened for communication with return port 52 and return line 53.

The reverse position is illustrated with respect to the control valve 42 wherein the solenoid 62 associated therewith is energized to pull the armature 59 and spool 57 to the left. In this position, the port 44 communicates with supply port 47 and the port 43 communicates with the return port 53.

The solenoids 61 and 62 are electrically connected to a power source 71 such as the standard 110 volt A-C power supply through conductors 72, 73, 74, and 75 which connect through relay contacts 76, 77, 78, and 79 associated with relays 81, 82, 83, and 84. The source of actuating signals for the relays is derived from a computer which is constructed and operated as hereinafter described.

Means is provided for sensing the direction of transmission of the transmit transducer and consists of a tangent potentiometer 91 mechanically connected between the frame 21 and the wave director 11 so that movement of the frame 21 by the actuator 36 causes the movable contact of the potentiometer to move correspondingly. Suitable gearing and matched windings of the potentiometer relate its motion directly to the tangent of the angle of transmission. A voltage source 92 is connected across the potentiometer 91. Thus, the voltage sensed by the movable contact of the potentiometer is a measure sensed by the movable contact of the potentiometer is a measure of the tangent of the angle corresponding to the direction of the transmitted signal. The output of the potentiometer movable contact is connected to a multiplier 94 through conductor 95.

Similar means is provided for sensing the direction of orientation of the receive wave director 12 and consists of a potentiometer 96 connected mechanically between the frame 22 and the wave director 12. The potentiometer 96 is electrically connected across a D-C source 97. The output of the potentiometer movable contact is applied to the input of a multiplier 98 through conductor 100.

Since the tangent function approaches infinity as the measured angle approaches 90°, it is not possible to derive a voltage representative of the tangent function including the range of 90°. However, as a practical matter, the tangent function has a value of about 2.6 at 69° which is easily obtainable as a limiting voltage by terminating the windings of the potentiometers at approximately that value and applying a voltage of 2.6 volts thereat. Also, the potentiometers are constructed to have a lower limiting value approximately a factor of 10 less than the upper limiting value. The lower value corresponds to approximately 15° whereat the value of the tangent function is approximately 0.26.

Means is provided for generating voltages representing the coordinates $(x,y)$ of the portion of the area to be scanned and the distance (L) between transmit and receive wave directors. Such means consists of voltage divider potentiometers 101, 102, and 103 which are connected in parallel across D-C source 104. The output voltage on the movable contact of the potentiometer 101 represents $x$ and is connected to an input of multiplier 94. The output voltage of potentiometer 102 represents $y$ and is connected to the input of subtracting amplifiers 106 and 107; the output of potentiometer 103 represents L and is connected to the input of subtractor 108.

A computer is provided for comparing the selection of coordinates of inspection with the sensed directions of transmission and reception and to generate a signal representing any difference. The computer is provided with two sections, a transmit control section and a receive control section. The transmit control section includes multiplier 94 which forms a voltage representing $x \tan \alpha$ at its output. This voltage is applied to subtracting amplifier 106 together with a voltage representing $y$ from potentiometer 102. The output $(y - x \tan \alpha)$ will have a magnitude directly depending upon the magnitude of the difference between the desired orientation and the actual orientation.

This output is connected through a branched network to ground. Each brand of the network includes one of diodes 111 and 112 and one of the relay solenoid coils 113 and 114, as shown in the drawing, the direction of conduction of the diodes being opposite in each branch. Thus diode 111 conducts when the output of the subtracting amplifier 106 is positive and diode 112 when the output is negative.

When either diode conducts, a current will flow through its associated relay. When this current is sufficiently great, the relay becomes energized and closes its associated contacts which in turn completes the circuit between the power supply and part of the control solenoid 61 to energize the same. This causes the armature 58 to pull the spool 56 and then to connect the supply fluid to the actuator 36. As the actuator 36 moves the movable transducer holder and frame, it also changes the position of the movable contact on the potentiometer 91 and thus completes a servo control loop. The gain of the loop can be controlled by adjusting the gain of the subtracting amplifier 106.

The receive control section of the computer includes subtractor 108 which forms a voltage representing $(L-x)$ at its output. It also includes a multiplier 98 having inputs connected to the output of subtractor 108 and to conductor 100. The output of multiplier 98 $(L-x) \tan \beta$, is applied to subtracting amplifier 107 together with the voltage representing $y$ from potentiometer 102. The output of subtracting amplifier 107 $(L-x) \tan \beta - y$, is connected through a branched network to ground. Each branch of the network includes one of diodes 122 and 123 and one of coils 124 and 126 of relay solenoids 83 and 84, the direction of conduction of the diodes being opposite in each branch. Thus diode 123 conducts when the output of the subtracting amplifier 121 is negative, and the diode 122 conducts when the output is positive. When either of the diodes 122 or 123 conducts, a current flows through its associated relay solenoid, which, when sufficiently great, closes one of the relay contacts 78 or 79, and completes a power supply circuit to receive wave director control solenoid 62. The receive wave director solenoid operates in the same manner as previously described with respect to the transmit direction control. As the actuator 37 moves the movable transducer holder 17 and frame 22, it also changes the position of the movable contact on the potentiometer 96 and thus completes a servo control loop. The gain of the loop can be controlled by adjusting the gain of subtracting amplifier 107.

Operation of the apparatus in performing the method can now be described, as follows: Let it be assumed that the movable transducer holders 16 and 17 of each of the wave directors 11 and 12 are oriented so that they transmit and receive ultrasonic waves from a desired area to be inspected having coordinates $(x, y)$ within the test object. The area may for example lie on a line Q which may be a longitudinal weld line. Although not a requirement, it will also be assumed, for simplicity, that the line S joining the wave director output surfaces 18 and 19 is parallel to the line Q.

Let the distance between the lines S and Q be represented by $y$, the distance from the left edge of test object to P be represented by $x$, and the total length of the test object along between the wave directors and along R be L. In order to orient both the wave directors so that they are directed at P, the inspection location, it is sufficient if the following equations are satisfied:

$$x \tan \alpha - y = 0 \quad (1)$$
$$(L-x) \tan \beta - y = 0 \quad (2)$$

where $\alpha$ is the angle formed between the line S extending between the wave directors (normal to contact areas 18 and 19) and the line T joining the transmit wave director and P; and $\beta$ is the angle formed between the line S and the line R joining the receive wave director and P. The Equations 1 and 2 are derived directly from the definitions of the tan $\alpha$ and tan $\beta$.

The computer transmit and receive control sections are constructed to be analogs of the left hand expressions of Equations 1 and 2. Thus, the transmit control section forms the expression $x \tan \alpha - y$, $x \tan \beta$ from multiplier 94 from which $y$ is subtracted by subtracting amplifier 106. The receive control section forms $(L-x) \tan \beta - y$; $L-x$ from subtractor 108 times tan $\beta$ at multiplier 98, from which $y$ is subtracted by subtracting amplifier 107.

After calibration of the potentiometer, L is measured and set into potentiometer 103, and $y$, also a fixed number in this illustration, is measured and set into potentiometer 102. Then, $x$ is selected by potentiometer 101, the selection of which defines the coordinates of the area to be inspected $(x, y)$.

If Equation 1 is satisfied, the output of subtracting amplifier 106 will be zero, and the direction of transmission would be correct. If the equation is not satisfied, the output will be positive or negative and will have a magnitude proportional to the difference between the desired and actual orientation. This output is applied to the polarity sensitive network of the transmit control section which causes the actuator 36 to move to eliminate the difference.

If Equation 2 is satisfied, the output of subtracting amplifier 107 will be zero and the direction of reception will be correct. If the equation is not satisfied, the output will have a magnitude proportional to the difference between the desired and actual orientation. This output is applied to the polarity sensitive network of the receive control section which controls the motion of actuator 37 in the same manner to eliminate the difference as previously described with respect to the transmit control section.

In order to scan the weld line Q it is only necessary to advance or set back the potentiometer 101 to the desired coordinate of the area to be inspected. This may be accomplished by hand. Continuous scanning is easily achieved by connecting each of the potentiometers 101 and 102 to the drive motors 118 and 119 through suitable couplings (not shown). The drive motor can then be set to advance either potentiometer 101 or 102 according to any desired program. For instance, for scanning the weld line Q, the drive motor 118 would be set to advance potentiometer 101 from a minimum to a maximum position. From the preceding description, it is evident that the inspection route defined by the potentiometer will be carried out automatically by the computer direction control equipment and wave directors.

Means is provided for stopping the scan upon receiving a signal of greater strength than a predetermined value and consists of a peak reading voltmeter 121 connected to the output of the analyzer 98. The voltmeter 121 is provided with switch means 122 connected in the power line to the motors 118 and 119. When a signal of greater than the predetermined value is received, the voltmeter operates to open the switch means so that the scanning operation is stopped and the coordinates of the flaw scanning the large signal can be read.

As shown in the lower portion of the drawing, there is provided means for displaying the position of the beam paths and their intersection on an oscilloscope 131. Such means include a conventional linear sweep 132, the output, $X(t)$, of which drives the horizontal plates 133 of the oscilloscope 131. The sweep 132 may be part of the oscilloscope circuitry or may be provided as a separate unit. The maximum voltage to be supplied by the sweep 132 is determined by the sensitivity of the oscilloscope. The maximum voltage $X_{max}$ generated in the sweep 132 is made available on conductor 134 and will be used in the manner to be described hereinafter. Generally, a sweep repetition rate of the order of several times a second is adequate in this applicaation.

The sweep voltages $Y_1(t)$ and $Y_2(t)$ applied across the vertical plates 135 are derived from the product of the sweep signal $X(t)$ multiplied by the tangent of the angles of the wave train paths. These voltages $Y_1$ and $Y_2$ are applied alternately by switch 136 so that both a representation T', of the transmitted ultrasonic wave train, and a representation R', of the received ultrasonic wave train, are recorded on the oscilloscope 131. The switch is controlled by the sweep signal as supplied on conductor 137.

To this end, the sweep signal is applied through conductor 137 to the input of a multiplier 138, the voltage representing tan $\alpha$ being applied to the other input through conductor 139. The output of multiplier 138, $Y_1(t) = X(t) \tan \alpha$, is connected to the switch 136 through the conductor 141. When $Y_1(t)$ is applied to the vertical plates, the electron beam will trace a path T' having the coordinates $[X(t), Y_1(t)]$, representing the transmit ultrasonic wave train path.

The received ultrasonic wave train path R' is formed of two components, one representing specifically the sweep including tangent $\beta$ information and the other component specifying the coordinates of origin and containing size proportionality of the test object as derived from the voltages representing $y$ and L.

Thus, a divider 142 is provided to yield the scale factor $Y/L$ which is then applied to one input of multiplier 143, the other input being connected to conductor 134 to receive the maximum value $X_{max}$ of the horizontal sweep voltage. The output of the multiplier 143 represents the starting coordinates for the receive wave director sweep.

A vertical plate sweep signal representing the other part of the received ultrasonic wave train is derived from a multiplier 144 to which is applied the sweep signal $X(t)$ at one input on conductor 146 and the voltage representing tangent β through conductor 147 at the other input. The output of the multiplier 144 is subtracted from the reference coordinates value in subtractor 148, to derive the output $Y_2(t) = (Y/L)X_{max.} = X(t)$ tan β.

When the switch 136 applies $Y_1(t)$ the trace follows $[X(t), X(t)$ tan α$]$, a straight line having a slope of tangent α and indicated in the drawing at T'. When the switch applies $Y_2(t)$ the trace follows the relation $[X(t), (Y/L)X_{max.} - X(t)$ tan β$]$, a straight line having a slope —tan β and origin at $(Y/L)X_{max.}$. This trace is labelled in the drawing as R'. It is easily seen that the triangle thus formed by the traces T' and R' and the undeflected sweep are proportional and in conformal relation to the triangle formed by the lines R, S, T in the test object. Thus, a conformal map of the ultrasonic wave trains has been provided by the display apparatus.

It is apparent from the foregoing that there has been provided a new and improved method and apparatus for detecting flaws in objects which can orient portions of the wave directors so that the directions of transmission and reception intersect the area to be inspected without requiring information from the ultrasonic transmitted and received wave trains. The method and apparatus of the present invention is also seen to be adaptable to a wide variety of inspection techniques including not only longitudinal welds but girth welds and to blanket inspection procedures wherein the entire test object may be inspected. In such an inspection, one direction of scan may be cycled through its entire range, the other direction of scan being stepwise advanced after each cycle.

Also, it will be understood that I have shown only one transmitter and receiver for simplicity of presentation. However, my method and apparatus envisage the use of multiple transmitters and receivers and multiple control units, each of the transmitters and receivers and control units being interchangeable in function by the employment of suitable switching means.

There has also been provided a very convenient position display system which presents a map of the lines defined by the direction of transmission and reception of ultrasonic wave trains from the test object. This map enables the operator to maintain a constant, easily readable visual check on the testing operation, and to instantly detect any malfunction in the control equipment. The map also provides an approximate indication of the area being inspected.

I claim:

1. In apparatus for the non-destructive testing of an object to determine the existence of flaws in a region thereof, transmitting means adapted to make contact with the object for introducing ultrasonic wave trains into the object, said transmitting means including first control means for adjusting the direction that the ultrasonic wave trains are introduced into the object, receiving means adapted to make contact with the object for receiving ultrasonic wave trains from the object, said receiving means including second control means for adjusting the direction from which the ultrasonic wave trains are received from the object, means connected to the transmitting means and to the receiving means and producing first and second signals representing the direction of introduction and the direction of the reception of the ultrasonic wave trains, means producing third and fourth signals for driving said first and second control means to cause introduction and reception of ultrasonic wave trains in desired directions which intersect in the region being inspected, and error detecting means receiving said first and second and said third and fourth signals and supplying error correct signals to said first and second control means.

2. In apparatus for use in the non-destructive testing of a test object to determine the existence and location of flaws in a region thereof, a transmit wave director assembly adapted to be placed in contact with the test object at a first location for introducing ultrasonic wave trains into the test object in a predetermined direction, first control means connected to said transmit wave director assembly for causing it to scan a region of the test object to be inspected, a receive wave director assembly adapted to be placed in contact with the test object at a second location spaced apart from said first location for receiving ultrasonic wave trains from the test object in a predetermined direction, second control means connected to said receive wave director assembly for causing it to scan said region of the test object to be inspected, and synchronizing means connected to said first and second control means for causing the receive wave director assembly and transmit wave director to scan the test object in synchronism with each other so that, when a flaw is encountered during inspection of said region by the introduced ultrasonic wave trains, certain of the wave trains are deflected from said region in the direction of said receive wave director assembly and are received thereby, said synchronizing means including means producing first signals which indicate the direction of transmission of the transmit wave director assembly and the direction of reception of the receive wave director assembly, means for generating second signals representing the desired direction of scan for each of said transmit and receive wave assemblies, means for generating additional signals representing the distance from said transmit and receive wave director assemblies to the region to be inspected and the distance between the transmit and receive wave director assemblies, computer means receiving said first, second and additional signals and deriving error signals therefrom representing the difference between the desired direction and the sensed directions of transmission and reception, and means supplying said error signals to said first and second control means for correcting the directions of scan of the transmit and receive wave director assemblies.

3. Apparatus as in claim 2 wherein each of said transmit and receive wave director assemblies is maintained in ultrasonic wave transmission contact with the test object and includes a wave director and a transducer engaging the wave director together with means for adjusting the relative position of the transducer on the wave director for varying the direction of transmission or reception of ultrasonic wave trains from the test object.

4. Apparatus as in claim 2 in which said computer means is an analog computer.

5. Apparatus as in claim 2 in which the means for controlling each of the wave directors includes means connected to the wave directors to cause the direction of transmission and reception of the wave directors to be varied, and means supplying power to said last named means, said power supplying means being controlled by said computer means.

6. Apparatus as in claim 2 together with electrical conformal map display means connected to said means generating voltages representing the inspection coordinates and to display the lines representing the directions of transmission and reception and their intersection.

7. Apparatus as in claim 6 in which said conformal map display means includes an oscilloscope having horizontal and vertical deflection circuits, means for generating a direction voltage representing the scale ratio of the depth coordinate of inspection to the distance coordinate between said first and second locations, means for driving the horizontal deflection circuit with a sweep voltage, the vertical deflection circuit being driven alternately by the horizontal sweep voltage modified by said direction voltage and then by the horizontal sweep voltage modified by the negative of said direction voltage, the starting coordinate for the sweep of the horizontal sweep voltage modified by the negative of said direction voltage also being referenced to the voltage representing the scale ratio.

8. In apparatus for use in the non-destructive testing of an object to determine the existence and location of flaws in the object comprising means for introducing an ultrasonic wave train into the object including means for varying and sensing the direction of introduction of said wave trains, means for receiving ultrasonic wave trains from the object including means for varying and sensing the direction of reception of received wave trains, means for generating signals representing the coordinates of the portion of the object to be inspected for both the transmit and receive directions, a computer including a transmit control section for comparing the generated signal for the transmit direction with the sensed direction of transmission to determine whether the direction of transmission intersects the portion of the object to be inspected, means responsive to said transmit control section for causing said means for varying the direction of transmission of said transmit means to shift the direction of transmission to intersect the portion to be tested, said computer further including a receive control section for comparing the generated signal for the receive direction with the sensed direction of reception to determine whether the direction of reception intersects the portion of the object to be inspected, means responsive to said receive control section for causing said means for varying the direction of reception of said receive means to shift the direction of reception to intersect the portion to be tested.

References Cited

UNITED STATES PATENTS

| | | | |
|---|---|---|---|
| 2,819,613 | 1/1958 | Neiley | 73—67.7 |
| 2,937,522 | 5/1960 | McGaughey | 73—67.7 |
| 3,028,751 | 4/1962 | Joy | 73—67.7 XR |
| 3,100,987 | 8/1963 | Bincer | 73—67.7 |

RICHARD C. QUEISSER, *Primary Examiner.*

JOHN P. BEAUCHAMP, JR., *Assistant Examiner.*